United States Patent
Wang et al.

(10) Patent No.: US 12,397,350 B2
(45) Date of Patent: Aug. 26, 2025

(54) MULTI-METAL MATERIAL BUILD DEVICE USING LASER 3D PRINTING, AND WORKING METHOD THEREOF

(71) Applicant: JIANGSU UNIVERSITY OF SCIENCE AND TECHNOLOGY, Jiangsu (CN)

(72) Inventors: Qiuping Wang, Jiangsu (CN); Jieren Guan, Jiangsu (CN)

(73) Assignee: JIANGSU UNIVERSITY OF SCIENCE AND TECHNOLOGY, Jiangsu (CN)

( * ) Notice: Subject to any disclaimer, the term of this patent is extended or adjusted under 35 U.S.C. 154(b) by 0 days.

(21) Appl. No.: 18/854,975

(22) PCT Filed: Apr. 21, 2022

(86) PCT No.: PCT/CN2022/088095
§ 371 (c)(1),
(2) Date: Oct. 8, 2024

(87) PCT Pub. No.: WO2023/193307
PCT Pub. Date: Oct. 12, 2023

(65) Prior Publication Data
US 2025/0242413 A1    Jul. 31, 2025

(30) Foreign Application Priority Data
Apr. 8, 2022    (CN) .......................... 202210367685.8

(51) Int. Cl.
*B22F 12/41*    (2021.01)
*B22F 12/53*    (2021.01)
(Continued)

(52) U.S. Cl.
CPC .............. *B22F 12/41* (2021.01); *B22F 12/53* (2021.01); *B22F 12/67* (2021.01); *B33Y 10/00* (2014.12); *B33Y 30/00* (2014.12)

(58) Field of Classification Search
CPC .......... B22F 12/41; B22F 12/53; B22F 12/67; B33Y 10/00; B33Y 30/00
See application file for complete search history.

(56) References Cited

U.S. PATENT DOCUMENTS

2019/0193157 A1    6/2019    Corsini

FOREIGN PATENT DOCUMENTS

| CN | 108393491 | | 8/2018 | |
|---|---|---|---|---|
| CN | 108393491 | A * | 8/2018 | .............. B22F 12/30 |

(Continued)

OTHER PUBLICATIONS

"International Search Report (Form PCT/ISA/210) of PCT/CN2022/088095", mailed on Dec. 16, 2022, with English translation thereof, pp. 1-6.

*Primary Examiner* — Rebecca Janssen
(74) *Attorney, Agent, or Firm* — JCIPRNET (57) ABSTRACT

Disclosed in the present disclosure are a multi-metal material build device using laser three-dimensional printing. The multi-metal material build device includes an optical path system, a base plate, a powder collecting module, a left vertical plate, a right vertical plate, a powder falling module, a powder feeding mechanism, a slide rail, a slide connection block, a rear scraper, an L-shaped bracket, a powder storage strip and a front scraper, where the base plate, the left vertical plate and the right vertical plate form a build chamber, the powder collecting module is located at a front end below the base plate, the powder falling module and the powder feeding mechanism are located at a rear side above (Continued)

the base plate, and the powder feeding mechanism is located behind the powder falling module.

8 Claims, 4 Drawing Sheets

(51) Int. Cl.
  *B22F 12/67* (2021.01)
  *B33Y 10/00* (2015.01)
  *B33Y 30/00* (2015.01)

(56) References Cited

FOREIGN PATENT DOCUMENTS

| | | |
|---|---|---|
| CN | 108580895 | 9/2018 |
| CN | 108907189 | 11/2018 |
| CN | 106735218 | 5/2019 |
| CN | 112008078 | 12/2020 |
| CN | 112453425 | 3/2021 |
| CN | 213257114 | 5/2021 |
| CN | 112958788 | 6/2021 |
| CN | 213500865 | 6/2021 |
| KR | 101872210 | 6/2018 |

\* cited by examiner

MULTI-METAL MATERIAL BUILD DEVICE USING LASER 3D PRINTING, AND WORKING METHOD THEREOF

CROSS-REFERENCE TO RELATED APPLICATION

This application is a 371 of international application of PCT application serial no. PCT/CN2022/088095, filed on Apr. 21, 2022, which claims the priority benefit of China application no. 202210367685.8, filed on Apr. 8, 2022. The entirety of each of the above mentioned patent applications is hereby incorporated by reference herein and made a part of this specification.

TECHNICAL FIELD

The present disclosure relates to the technical field of additive manufacturing, and particularly relates to a multi-metal material build device using laser three-dimensional (3D) printing, and a working method thereof.

BACKGROUND

As one of the additive manufacturing technologies, selective laser melting (SLM) is based on a principle of "discrete+stack". A 3D model is designed by using 3D design software, and converted into 2D data information to be transferred to a build apparatus. A high-energy laser beam serves as a heat source to melt, overlap, and stack powder feedstock point by point, track by track, and layer by layer. Without molds and cutting tools, high precision and high performance parts with complex geometric spatial structures are finally formed, which have been widely used in aerospace, marine and offshore industries, automotive industry, biomedical and other fields.

Currently, selective laser melting apparatuses in China can only form one kind of material, and cannot satisfy requirements of the industry for forming an integrated part with a plurality of materials. Once a chamber is opened to change powder, the continuity of forming will be affected, it is not conducive to performance guarantee, and the application will be restricted. Disclosed in China patent CN106735218B is a rotary multi-cylinder multi-material build device and method using selective laser melting. A rotary build cylinder mechanism and a rotary powder cylinder mechanism are arranged side by side on one side of a powder spreading mechanism, and a straight line connected by a build cylinder rotating shaft of the rotary build cylinder mechanism and a powder cylinder rotating shaft of the rotary powder cylinder mechanism is parallel to a straight guide rail of the powder spreading mechanism. The powder spreading mechanism spreads powder from the rotary powder cylinder mechanism to the rotary build cylinder mechanism for laser to operate above the rotary build cylinder mechanism. Circular machining of heterogeneous materials and a plurality of parts is implemented, and the working efficiency is improved. However, a size of a formed part is limited, a powder feeding cylinder occupies an inner space of a build chamber, and recovered powder material is likely to be contaminated. Disclosed in China patent CN108907189A is a multi-material build device and method based on metal 3D printing. A powder leakage nozzle is used to leak powder according to a powder leakage path. A powder leakage device and a powder spreading device are organically combined, so the applicability of multiple materials is improved. However, the powder still cannot be recovered separately, and a powder leakage pipe is pulled during operation of a powder spreading strip, so the powder leakage pipe is likely to be broken to cause air leakage, causing dust emission. Therefore, it is necessary to develop a selective laser melting apparatus which can satisfy advantages of multi-material forming, separate powder raw material recovery, and powder feeding and powder spreading.

SUMMARY

In order to solve the problems existing in the background art, an objective of the present disclosure is to provide a multi-metal material build device using laser three-dimensional (3D) printing, and a working method thereof. According to the present disclosure, different metal powder is recovered separately, a real-time conveying capability of a powder feeding mechanism and a compaction capability of a powder spreading mechanism are combined, and integrated rapid forming of a plurality of metal materials is implemented.

The present disclosure is achieved by the following technical solutions: a multi-metal material build device using laser 3D printing includes an optical path system, and further includes a base plate, a powder collecting module, a left vertical plate, a right vertical plate, a powder falling module, a powder feeding mechanism, slide rails, a slide connection block, a rear scraper, an L-shaped bracket, a powder storage strip and a front scraper, where the base plate, the left vertical plate and the right vertical plate form a build chamber, the powder collecting module is located at a front end below the base plate, the powder falling module and the powder feeding mechanism are located at a rear side above the base plate, and the powder feeding mechanism is located behind the powder falling module.

Inner sides of the left vertical plate and the right vertical plate are provided with a pair of slide rails in parallel, two pairs of L-shaped brackets are symmetrically arranged above the slide rails, two ends of the powder storage strip are arranged on the slide rails in a slide way through a slide connection block separately, one side of the powder storage strip is provided with the rear scraper, and the other side of the powder storage strip is provided with the front scraper.

The base plate is provided with a build cylinder, a first build substrate, a second build substrate, a first piston, a second piston, a powder collecting cylinder, a powder falling port and a powder collecting channel, the powder collecting cylinder is arranged at a front end of the base plate, the powder falling port is formed at an intersection of the powder collecting cylinder and the base plate, the powder collecting channel is connected to a lower end of the powder collecting cylinder, the build cylinder is arranged on a position on the base plate behind the powder collecting cylinder, the first build substrate and the second build substrate are arranged in the build cylinder, the second build substrate surrounds a periphery of the first build substrate, the first piston is arranged at a lower end of the first build substrate, four second pistons are arranged at a lower end of the second build substrate in a circumferential direction of the second build substrate, and the optical path system is arranged above the first build substrate and the second build substrate.

The powder collecting module includes three powder collecting structures, a screw rod, a support column, a third coupler and a third drive motor, each of the powder collecting structures includes a powder collecting groove, a guide rail strip, a powder collecting box, a handle and a third slide block, in each of the powder collecting structures, a pair of guide rail strips are arranged in parallel at an inner side of the powder collecting groove, the powder collecting box is slidably arranged in the powder collecting groove through the guide rail strips, the handle is arranged at an outer end of the powder collecting box, the third slide block is arranged at a bottom end of the powder collecting groove, the third slide block is in transmission connection to the screw rod, two ends of the screw rod are mounted on the support column, and one end of the screw rod penetrates the support column and then is in transmission connection to the third drive motor by means of the third coupler.

An air outlet is formed at a position of a bottom of the left vertical plate above the build cylinder, an air inlet is formed at a position of a bottom of the right vertical plate above the build cylinder, a left bracket and a right bracket are respectively arranged at positions of upper ends of the left vertical plate and the right vertical plate corresponding to the powder falling module, and a support is arranged at a position of an inner side of the right vertical plate below the right bracket.

The powder falling module includes a powder falling case, a clamping block, a fourth coupler, a micromotor, a powder falling channel and a rolling fan blade, the powder falling case has an upper portion being an inlet of a funnel shape and a lower portion being the powder falling channel of a rectangular hollow structure, one clamping block is arranged at each of two ends of the powder falling case, the two clamping blocks are mounted in the left bracket and the right bracket respectively, an upper portion of an inner side of the powder falling channel is provided with the rolling fan blade, one end of the rolling fan blade penetrates the powder falling case and is in transmission connection to the micromotor by means of the fourth coupler, and the micromotor is mounted on the support.

The powder feeding mechanism includes a first drive motor, a first coupler, a second drive motor, a second coupler, a first lead screw, a first slide block, a first clamp, a first powder feeding spray head, a first powder feeding pipe, a second lead screw, a second slide block, a second clamp, a second powder feeding spray head and a second powder feeding pipe, two ends of the first lead screw and the second lead screw are respectively mounted on two pairs of the L-shaped brackets, one end of the first lead screw is in transmission connection to the first drive motor by means of the second coupler, one end of the second lead screw is in transmission connection to the second drive motor by means of the first coupler, the first slide block is arranged on the first lead screw, the first clamp is arranged at a front end of the first slide block, the first powder feeding spray head is clamped in the first clamp, the first powder feeding pipe extends out from a top end of the first powder feeding spray head, the second slide block is arranged on the second lead screw, the clamp second is arranged at a front end of the second slide block, the second powder feeding spray head is clamped in the second clamp, and the second powder feeding pipe extends out from a top end of the second powder feeding spray head.

The powder storage strip is internally provided with a powder cavity of a hollow structure, an upper end of the powder storage strip is not higher than a lower end of the powder falling case, a lower nozzle of the first powder feeding spray head and a lower nozzle of the second powder feeding spray head, and a bottom end of the powder storage strip is provided with a powder discharge port.

Further, the multi-metal material build device using laser 3D printing further includes heaters. The heaters are arranged at lower ends of the first build substrate and the second build substrate, and laser used by the optical path system is Bessel beam.

Further, an inlet size of the powder collecting box is greater than a size of the powder collecting channel. Guarantee Further, the screw rod has a length greater than those of the three powder collecting grooves.

Further, the multi-metal material build device using laser 3D printing further includes a powder conveyor. The nozzles of the first powder feeding spray head and the second powder feeding spray head have diameters less than 1 mm, and inlets of the first powder feeding pipe and the second powder feeding pipe are connected to the powder conveyor.

Further, the slide connection block is driven by a motor through a belt.

Further, the rear scraper and the front scraper are made of high speed steel, and arc-shaped blades are arranged at bottoms of the rear scraper and the front scraper.

The present disclosure further provides a working method of the multi-metal material build device using laser 3D printing. The working method includes:
  step 1: connecting inert protective gas to enter from an air inlet and come out of an air outlet, manufacturing a build base plate according to a forming size of a part, and mounting the build base plate on a first build substrate or a second build substrate according to a size of the build base plate;
  step 2: adding first metal powder into a powder falling case according to material property requirements of a forming part, moving a slide connection block along a slide rail, so as to arrange a powder storage strip at a lower end of the powder falling case, starting a third drive motor, moving a third slide block along a screw rod, so as to arrange a powder collecting box of a first powder collecting structure at a lower end of a powder collecting channel, controlling a micromotor to drive a rolling fan blade to rotate to make the first metal powder fall into a powder cavity along a powder falling channel, moving a slide connection block along the slide rail to drive the powder storage strip to pass through the build base plate, making the first metal powder fall out along a powder discharge port and evenly spread on the build base plate under the action of a rear scraper, and making remaining first metal powder enter a powder collecting cylinder from a powder falling port and fall into a first powder collecting box through the powder collecting channel, so as to complete recovery of the first metal powder;
  step 3: scanning, by laser of an optical path system, the metal powder on the build base plate along a preset trajectory, so as to melt the metal powder to form a formed object, after scanning, controlling, by a first piston and a second piston, the first build substrate and the second build substrate respectively to descend by a height of one layer thickness, moving the slide connection block along the slide rail in an opposite direction, and performing, by a front scraper, powder spreading of a next layer;
  step 4: repeating step 3 until the first metal powder is completely formed;
  step 5: making a first powder feeding pipe in communication with second metal powder according to material property requirements of the forming part for second metal powder forming, moving the slide connection block along the slide rail, so as to arrange the powder storage strip below a first powder feeding spray head, making the second metal powder fall into the first powder feeding spray head along the first powder feeding pipe, controlling the second drive motor to move a first slide block along a first lead screw, making the second metal powder fall into the powder cavity from a nozzle of the first powder feeding spray head, controlling the third drive motor to move the third slide block along the screw rod, so as to arrange a powder collecting box of a second powder collecting structure at the lower end of the powder collecting channel, moving the slide connection block along the slide rail to drive the powder storage strip to pass through the formed object, making the second metal powder fall out along the powder discharge port and evenly spread on the formed object under the action of the rear scraper, and making remaining second metal powder enter the powder collecting cylinder from the powder falling port and fall into the second powder collecting box through the powder collecting channel, so as to complete recovery of the second metal powder;

step 6: repeating step 3 until the second metal powder is completely formed;

step 7: making a second powder feeding pipe in communication with third metal powder according to the material property requirements of the forming part for third metal powder forming, moving the slide connection block along the slide rail, so as to arrange the powder storage strip below a second powder feeding spray head, making the third metal powder fall into the second powder feeding spray head along the second powder feeding pipe, controlling a first drive motor to move a second slide block along a second lead screw, making the third metal powder fall into the powder cavity from a nozzle of the second powder feeding spray head, controlling the third drive motor to move the third slide block along the screw rod, so as to arrange a powder collecting box of a third powder collecting structure at the lower end of the powder collecting channel, moving the slide connection block along the slide rail to drive the powder storage strip to pass through the formed object, making the third metal powder fall out along the powder discharge port and evenly spread on the formed object under the action of the rear scraper, and making remaining third metal powder enter the powder collecting cylinder from the powder falling port and fall into the third powder collecting box through the powder collecting channel, so as to complete recovery of the third metal powder; and step 8: repeating step 3 until the third metal powder is completely formed.

The present disclosure has the beneficial effects as follows:

(1) According to the present disclosure, the powder feeding mechanism and a powder spreading mechanism are organically integrated to occupy no space of the build chamber. Powder spreading and compaction functions of a selective laser melting technology and a real-time powder feeding function of a laser cladding technology are used, a limitation that the selective laser melting technology can only form single materials is broken through, integrated rapid forming of a plurality of metal materials is implemented, and an application field is widened.

(2) The powder collecting module designed by the present disclosure can recover different powder separately, so as to avoid cross pollution, save material resources and reduce machining cost.

(3) The first build substrate and the second build substrate of the present disclosure are coaxially arranged, separately move or jointly move according to a size and shape of a part, a forming size is adjustable, powder is saved, and applicability is broader.

(4) The double scrapers provided in the present disclosure implement bidirectional powder spreading, so as to save a printing time and improve working efficiency.

DETAILED DESCRIPTIONS OF THE EMBODIMENTS

The technical solutions of the examples of the present disclosure are clearly and completely described below with reference to the drawings. Apparently, the described examples are merely some examples rather than all examples of the present disclosure. Based on the examples in the disclosure, all other examples derived by those of ordinary skill in the art without creative efforts fall within the scope of protection of the present disclosure.

In the description of the present disclosure, it should be noted that the orientation or position relations indicated by the terms "up", "down", "inner", "outer", "front end", "rear end", "two ends", "one end", "the other end", etc. are based on the orientation or position relations shown in the accompanying drawings, are merely for facilitating the description of the present disclosure and simplifying the description, rather than indicating or implying that the device or element referred to must have a particular orientation or be constructed and operated in a particular orientation, and therefore cannot be interpreted as limiting the present disclosure. Moreover, the terms "first" and "second" are merely for description and cannot be interpreted as indicating or implying relative importance.

In the description of the present disclosure, it should be noted that the terms "mount", "provided with", and "connect" should be understood in a broad sense. For example, "connect" can denote a fixed connection, a detachable connection, an integrated connection, a mechanical connection, an electrical connection, a direct connection, an indirect connection via an intermediate medium, or communication inside two elements, unless otherwise explicitly specified and defined. For those of ordinary skill in the art, the specific meanings of the above terms in the disclosure can be understood according to specific circumstances.

Example

Figure 1:
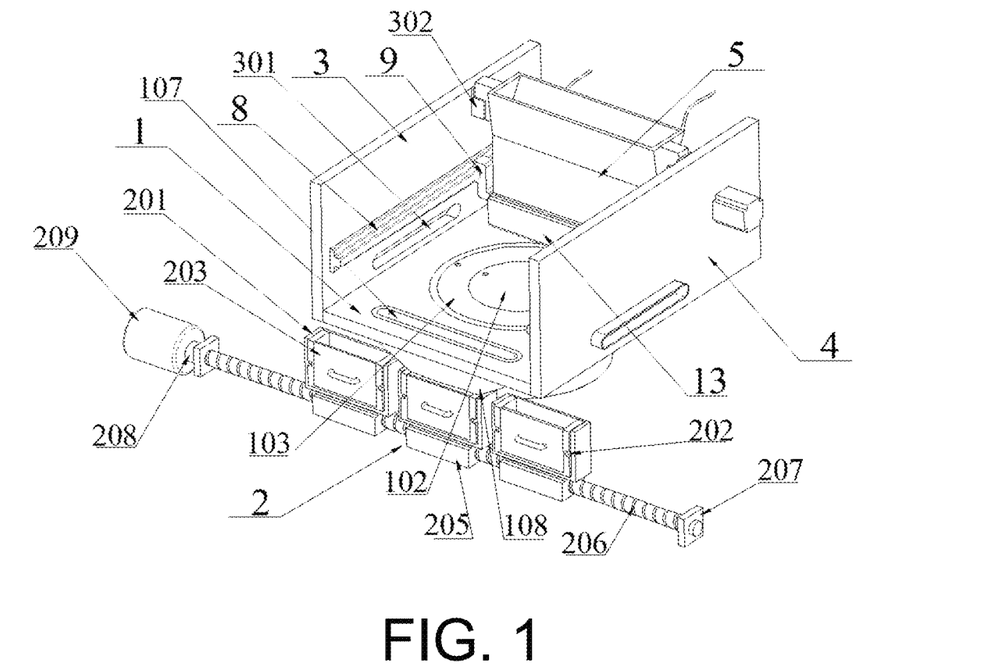
FIG. 1 is a schematic diagram of a three-dimensional structure according to an example of the present disclosure.

As shown in FIG. 1, a multi-metal material build device using laser three-dimensional (3D) printing includes an optical path system, a base plate 1, a powder collecting module 2, a left vertical plate 3, a right vertical plate 4, a powder falling module 5, a powder feeding mechanism, a slide rail 8, a slide connection block 9, a rear scraper 10, an L-shaped bracket 11, a powder storage strip 12 and a front scraper 13. The base plate 1, the left vertical plate 3 and the right vertical plate 4 form a build chamber. The powder collecting module 2 is located at a front end below the base plate 1. The powder falling module 5 and the powder feeding mechanism are located at a rear side above the base plate 1. The powder feeding mechanism is located behind the powder falling module 5. Inner sides of the left vertical plate 3 and the right vertical plate 4 are provided with a pair of slide rails 8 in parallel. Two pairs of L-shaped brackets 11 are symmetrically arranged above the slide rails 8. Two ends of the powder storage strip 12 are arranged on the slide rails 8 in a slide way through a slide connection block 9 separately. One side of the powder storage strip 12 is provided with the rear scraper 10, and the other side of the powder storage strip is provided with the front scraper 13.

As shown in FIGS. 1, 2, 3 and 4, the base plate 1 is provided with a build cylinder 101, a first build substrate 102, a second build substrate 103, a first piston 104, a second piston 105, a powder collecting cylinder 106, a powder falling port 107 and a powder collecting channel 108. The powder collecting cylinder 106 is arranged at a front end of the base plate 1. The powder falling port 107 is formed at an intersection of the powder collecting cylinder 106 and the base plate 1. The powder collecting channel 108 is connected to a lower end of the powder collecting cylinder 106. The build cylinder 101 is arranged on a position on the base plate 1 behind the powder collecting cylinder 106. The first build substrate 102 and the second build substrate 103 are arranged in the build cylinder 101. The second build substrate 103 surrounds a periphery of the first build substrate 102. The first piston 104 is arranged at a lower end of the first build substrate 102. Four second pistons 105 are arranged at a lower end of the second build substrate 103 in a circumferential direction of the second build substrate. The optical path system is arranged above the first build substrate 102 and the second build substrate 103.

Figure 2:
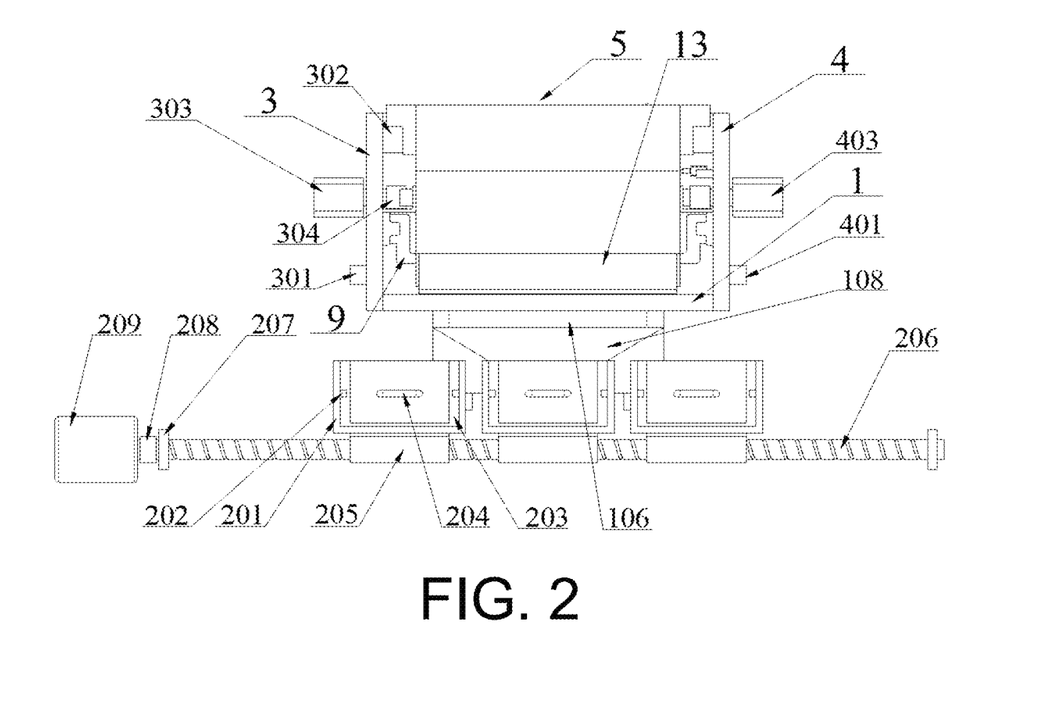
FIG. 2 is a front view according to an example of the present disclosure.

As shown in FIG. 2, the powder collecting module 2 includes three powder collecting structures, a screw rod 206, a support column 207, a third coupler 208 and a third drive motor 209. Each of the powder collecting structures includes a powder collecting groove 201, a guide rail strip 202, a powder collecting box 203, a handle 204 and a third slide block 205. In each of the powder collecting structures, a pair of guide rail strips 202 are arranged in parallel at an inner side of the powder collecting groove 201, the powder collecting box 203 is slidably arranged in the powder collecting groove 201 through the guide rail strips 202, the handle 204 is arranged at an outer end of the powder collecting box 203, the third slide block 205 is arranged at a bottom end of the powder collecting groove 201, the third slide block 205 is in transmission connection to the screw rod 206, two ends of the screw rod 206 are mounted on the support column 207, and one end of the screw rod 206 penetrates the support column 207 and then is in transmission connection to the third drive motor 209 by means of the third coupler 208.

As shown in FIGS. 1 and 2, an air outlet 301 is formed at a position of a bottom of the left vertical plate 3 above the build cylinder 101, and an air inlet 401 is formed at a position of a bottom of the right vertical plate 4 above the build cylinder 101. A left bracket 302 and a right bracket 402 are respectively arranged at positions of upper ends of the left vertical plate 3 and the right vertical plate 4 corresponding to the powder falling module 5, and a support 405 is arranged at a position of an inner side of the right vertical plate 4 below the right bracket 402.

Figure 5:
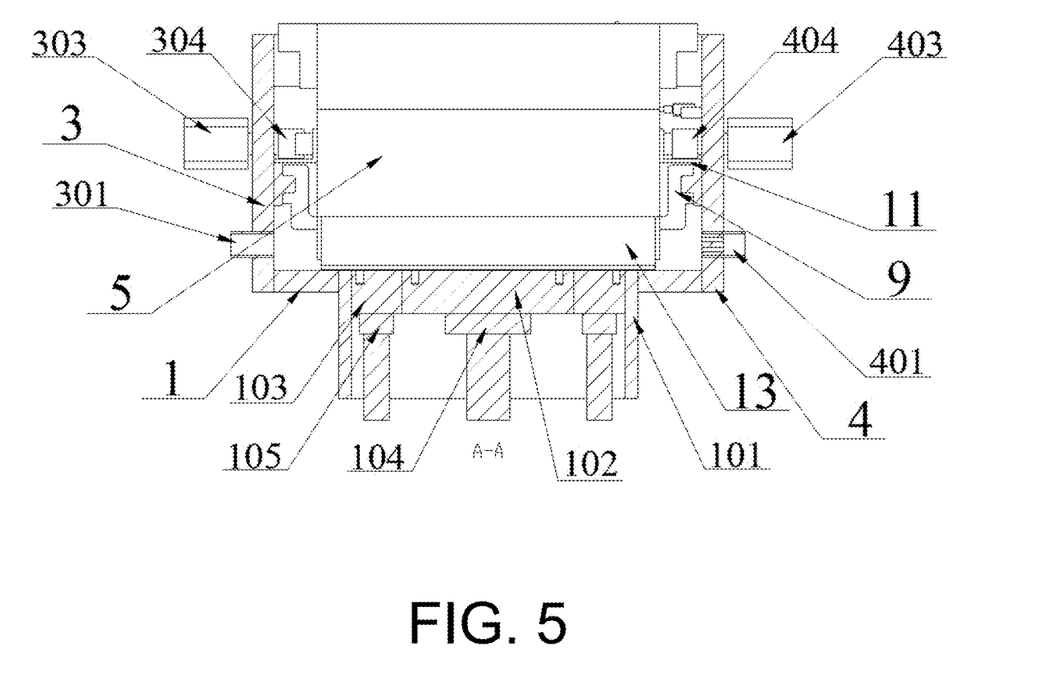
FIG. 5 is a sectional view at portion B-B in FIG. 3 according to the present disclosure.
Figure 6:
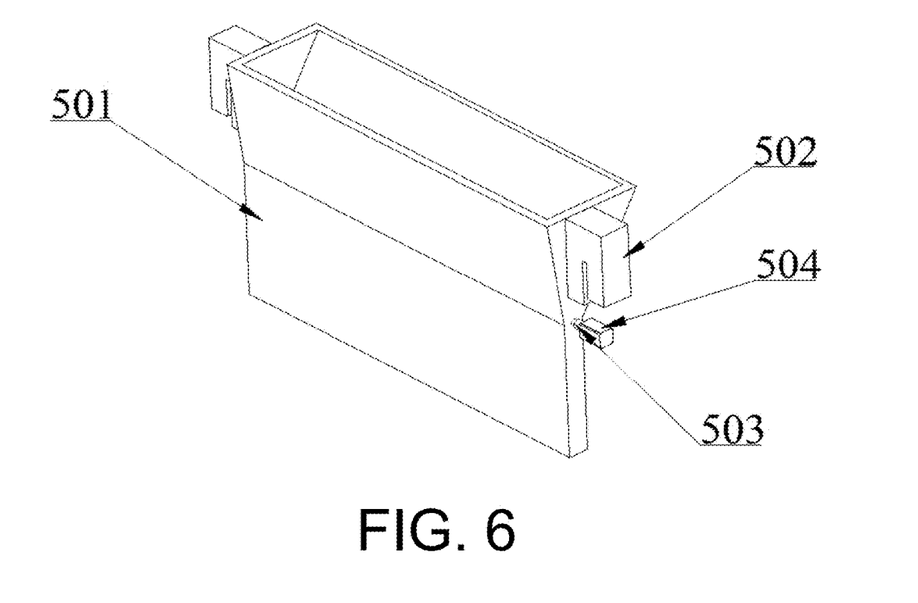
FIG. 6 is a schematic structural diagram of a powder falling case according to an example of the present disclosure.

As shown in FIGS. 5 and 6, the powder falling module 5 includes a powder falling case 501, a clamping block 502, a fourth coupler 503, a micromotor 504, a powder falling channel 505 and a rolling fan blade 506. The powder falling case 501 has an upper portion being an inlet of a funnel shape and a lower portion being the powder falling channel 505 of a rectangular hollow structure. One clamping block 502 is arranged at each of two ends of the powder falling case 501. The two clamping blocks 502 are mounted in the left bracket 302 and the right bracket 402 respectively. An upper portion of an inner side of the powder falling channel 505 is provided with the rolling fan blade 506. One end of the rolling fan blade 506 penetrates the powder falling case 501 and is in transmission connection to the micromotor 504 by means of the fourth coupler 503. The micromotor 504 is mounted on the support 405.

Figure 3:
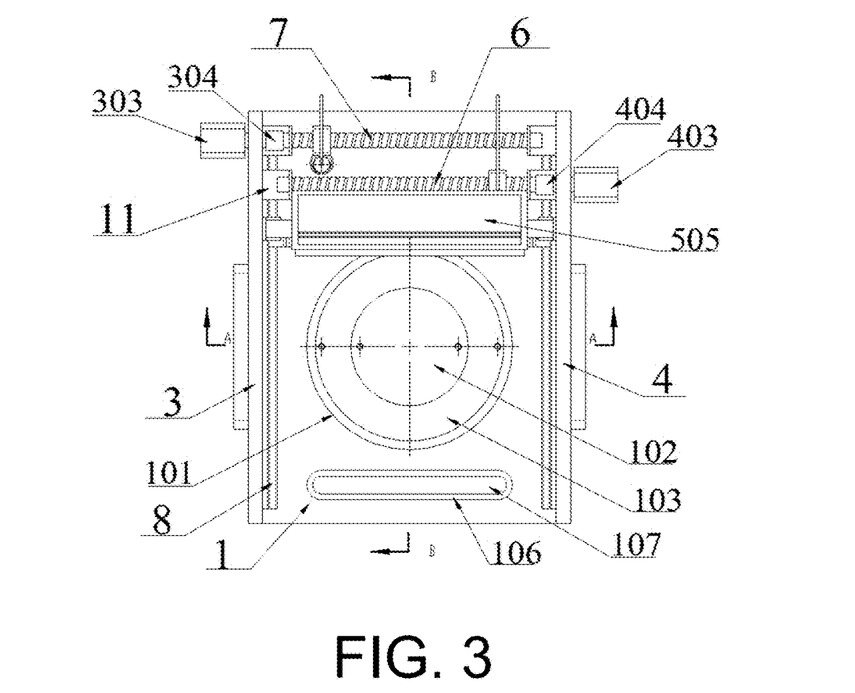
FIG. 3 is a top view of a build chamber according to an example of the present disclosure.
Figure 4:
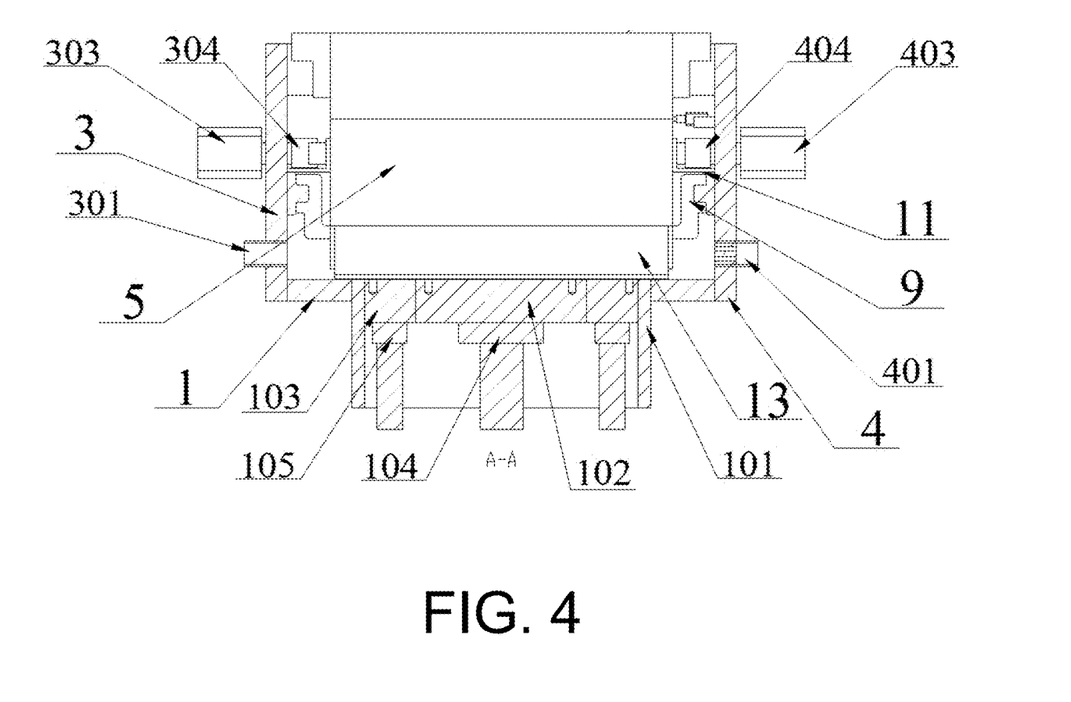
FIG. 4 is a sectional view at portion A-A in FIG. 3 according to the present disclosure.
Figure 7:
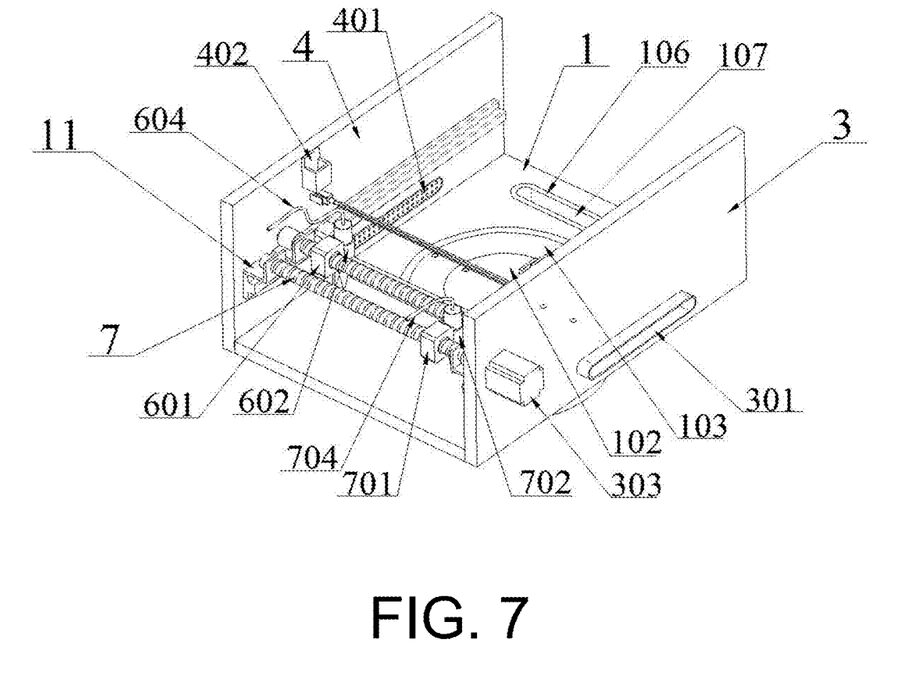
FIG. 7 is a schematic diagram of a powder feeding mechanism according to an example of the present disclosure.
Figure 8:
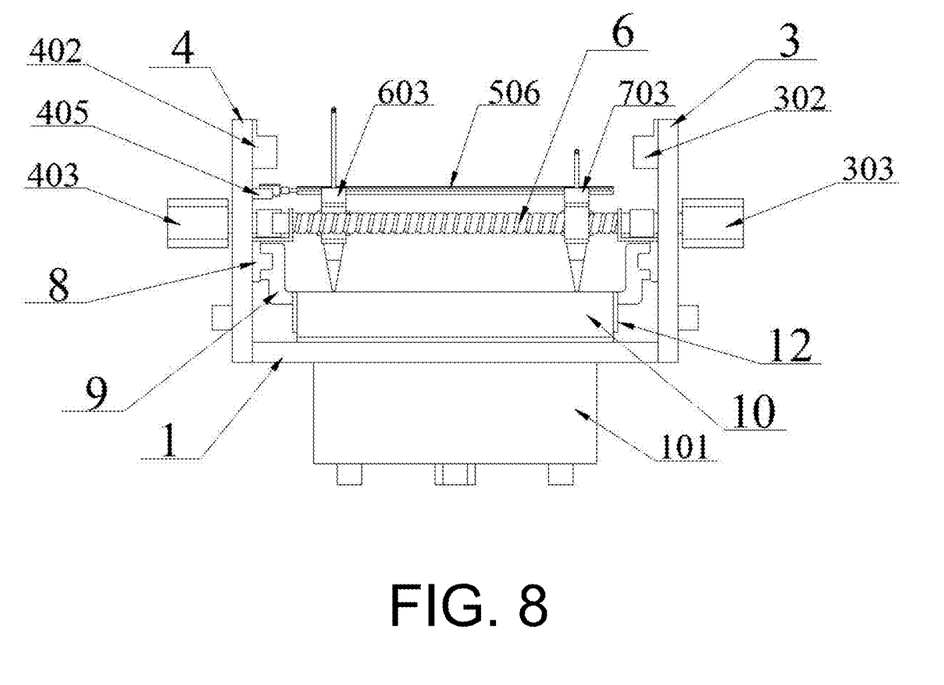
FIG. 8 is a front view of a powder feeding mechanism according to an example of the present disclosure.

As shown in FIGS. 3, 7 and 8, the powder feeding mechanism includes a first drive motor 303, a first coupler 304, a second drive motor 403, a second coupler 404, a first lead screw 6, a first slide block 601, a first clamp 602, a first powder feeding spray head 603, a first powder feeding pipe 604, a second lead screw 7, a second slide block 701, a second clamp 702, a second powder feeding spray head 703 and a second powder feeding pipe 704. Two ends of the first lead screw 6 and the second lead screw 7 are respectively mounted on two pairs of the L-shaped brackets 11. One end of the first lead screw 6 is in transmission connection to the first drive motor 303 by means of the second coupler 404. One end of the second lead screw 7 is in transmission connection to the second drive motor 403 by means of the first coupler 304. The first slide block 601 is arranged on the first lead screw 6. The first clamp 602 is arranged at a front end of the first slide block 601. The first powder feeding spray head 603 is clamped in the first clamp 602. The first powder feeding pipe 604 extends out from a top end of the first powder feeding spray head 603. The second slide block 701 is arranged on the second lead screw 7. The second clamp 702 is arranged at a front end of the second slide block 701. The second powder feeding spray head 703 is clamped in the second clamp 702. The second powder feeding pipe 704 extends out from a top end of the second powder feeding spray head 703.

As shown in FIG. 5, the powder storage strip 12 is internally provided with a powder cavity 121 of a hollow structure. An upper end of the powder storage strip 12 is not higher than a lower end of the powder falling case 501, a lower nozzle of the first powder feeding spray head 603 and a lower nozzle of the second powder feeding spray head 703. A bottom end of the powder storage strip 12 is provided with a powder discharge port 122.

The multi-metal material build device using laser 3D printing further includes heaters. The heaters are arranged at lower ends of the first build substrate 102 and the second build substrate 103. Laser used by the optical path system is Bessel beam. The heaters and a pipe system are not shown in the figures.

As shown in FIG. 1, an inlet size of the powder collecting box 203 is greater than a size of the powder collecting channel 108.

As shown in FIG. 1, the screw rod 206 has a length greater than those of the three powder collecting grooves 201.

The multi-metal material build device using laser 3D printing further includes a powder conveyor. The powder conveyor is not shown in the figures. The nozzles of the first powder feeding spray head 603 and the second powder feeding spray head 703 have diameters less than 1 mm. Inlets of the first powder feeding pipe 604 and the second powder feeding pipe 704 are connected to the powder conveyor.

The slide connection block 9 is driven by a motor through a belt.

The rear scraper 10 and the front scraper 13 are made of high speed steel. Arc-shaped blades are arranged at bottoms of the rear scraper and the front scraper.

Working Method

A working method of the multi-metal material build device using laser 3D printing includes:
- step 1: inert protective gas is connected to enter from an air inlet 401 and come out of an air outlet 301, a build base plate is manufactured according to a forming size of a part, and the build base plate is mounted on a first build substrate 102 or a second build substrate 103 according to a size of the build base plate;
- step 2: first metal powder is added into a powder falling case 501 according to material property requirements of a forming part, a slide connection block 9 moves along a slide rail 8, so as to arrange a powder storage strip 12 at a lower end of the powder falling case 501, a third drive motor 209 is started, a third slide block 205 moves along a screw rod 206, so as to arrange a powder collecting box 203 of a first powder collecting structure at a lower end of a powder collecting channel 108, a micromotor 504 is controlled to drive a rolling fan blade 506 to rotate to make the first metal powder fall into a powder cavity 121 along a powder falling channel 505, a slide connection block 9 moves along the slide rail 8 to drive the powder storage strip 12 to pass through the build base plate, the first metal powder falls out along a powder discharge port 122 and is evenly spread on the build base plate under the action of a rear scraper 10, and remaining first metal powder enters a powder collecting cylinder 106 from a powder falling port 107 and falls into a first powder collecting box 203 through the powder collecting channel 108, so as to complete recovery of the first metal powder;
- step 3: laser of an optical path system scans the metal powder on the build base plate along a preset trajectory, so as to melt the metal powder to form a formed object, after scanning, a first piston 104 and a second piston 105 controls the first build substrate 102 and the second build substrate 103 respectively to descend by a height of one layer thickness, the slide connection block 9 moves along the slide rail 8 in an opposite direction, and a front scraper 13 performs powder spreading of a next layer;
- step 4: step 3 is repeated until the first metal powder is completely formed;
- step 5: a first powder feeding pipe 604 in communication with second metal powder according to the material property requirements of the forming part for second metal powder forming, the slide connection block 9 moves along the slide rail 8, so as to arrange the powder storage strip 12 below a first powder feeding spray head 603, the second metal powder falls into the first powder feeding spray head 603 along the first powder feeding pipe 604, the second drive motor 403 to is controlled move a first slide block 601 along a first lead screw 6, the second metal powder falls into the powder cavity 121 from a nozzle of the first powder feeding spray head 603, the third drive motor 209 is controlled to move the third slide block 205 along the screw rod 206, so as to arrange a powder collecting box 203 of a second powder collecting structure at the lower end of the powder collecting channel 108, the slide connection block 9 moves along the slide rail 8 to drive the powder storage strip 12 to pass through the formed object, the second metal powder falls out along the powder discharge port 122 and is evenly spread on the formed object under the action of the rear scraper 10, and remaining second metal powder enters the powder collecting cylinder 106 from the powder falling port 107 and fall into the second powder collecting box 203 through the powder collecting channel 108, so as to complete recovery of the second metal powder;
- step 6: step 3 is repeated until the second metal powder is completely formed;
- step 7: a second powder feeding pipe 704 is in communication with third metal powder according to the material property requirements of the forming part for third metal powder forming, the slide connection block 9 movies along the slide rail 8, so as to arrange the powder storage strip 12 below a second powder feeding spray head 703, the third metal powder falls into the second powder feeding spray head 703 along the second powder feeding pipe 704, a first drive motor 303 is controlled to move a second slide block 701 along a second lead screw 7, the third metal powder falls into the powder cavity 121 from a nozzle of the second powder feeding spray head 703, the third drive motor 209 is controlled to move the third slide block 205 along the screw rod 206, so as to arrange a powder collecting box 203 of a third powder collecting structure at the lower end of the powder collecting channel 108, the slide connection block 9 moves along the slide rail 8 to drive the powder storage strip 12 to pass through the formed object, the third metal powder falls out along the powder discharge port 122 and is evenly spread on the formed object under the action of the rear scraper 10, and remaining third metal powder enters the powder collecting cylinder 106 from the powder falling port 107 and falls into the third powder collecting box 203 through the powder collecting channel 108, so as to complete recovery of the third metal powder; and
- step 8: step 3 is repeated until the third metal powder is completely formed.

In the example of the method, three kinds of alloys IN718/316L/CuSn are taken as an example, the first metal powder is IN718, the second metal powder is 316L, and the third metal powder is CuSn.

The foregoing descriptions are only specific embodiments of the present disclosure, but the scope of protection of the present disclosure is not limited thereto. Any change or substitution that does not occur through creative labor shall be covered within the scope of protection of the present disclosure. Therefore, the scope of protection of the present disclosure shall be subject to the scope of protection defined in the claims.

What is claimed is:

1. A multi-metal material build device using laser three-dimensional (3D) printing, comprising an optical path system, further comprising a base plate, a powder collecting module, a left vertical plate, a right vertical plate, a powder falling module, a powder feeding mechanism, slide rails, a slide connection block, a rear scraper, L-shaped brackets, a powder storage strip and a front scraper, wherein the base plate, the left vertical plate and the right vertical plate form a build chamber, the powder collecting module is located at a front end below the base plate, the powder falling module and the powder feeding mechanism are located at a rear side above the base plate, and the powder feeding mechanism is located behind the powder falling module;

inner sides of the left vertical plate and the right vertical plate are provided with a pair of the slide rails in parallel, two pairs of L-shaped brackets are symmetrically arranged above the slide rails, two ends of the powder storage strip are arranged on the slide rails in a slide way through a slide connection block separately, one side of the powder storage strip is provided with the rear scraper, and the other side of the powder storage strip is provided with the front scraper;

the base plate is provided with a build cylinder, a first build substrate, a second build substrate, a first piston, a second piston, a powder collecting cylinder, a powder falling port and a powder collecting channel, the powder collecting cylinder is arranged at a front end of the base plate, the powder falling port is formed at an intersection of the powder collecting cylinder and the base plate, the powder collecting channel is connected to a lower end of the powder collecting cylinder, the build cylinder is arranged on a position on the base plate behind the powder collecting cylinder, the first build substrate and the second build substrate are arranged in the build cylinder, the second build substrate surrounds a periphery of the first build substrate, the first piston is arranged at a lower end of the first build substrate, four second pistons are arranged at a lower end of the second build substrate in a circumferential direction of the second build substrate, and the optical path system is arranged above the first build substrate and the second build substrate;

the powder collecting module comprises three powder collecting structures, a screw rod, a support column, a third coupler and a third drive motor, each of the powder collecting structures comprises a powder collecting groove, a guide rail strip, a powder collecting box, a handle and a third slide block, in each of the powder collecting structures, a pair of guide rail strips are arranged in parallel at an inner side of the powder collecting groove, the powder collecting box is slidably arranged in the powder collecting groove through the guide rail strips, the handle is arranged at an outer end of the powder collecting box, the third slide block is arranged at a bottom end of the powder collecting groove, the third slide block is in transmission connection to the screw rod, two ends of the screw rod are mounted on the support column, and one end of the screw rod penetrates the support column and then is in transmission connection to the third drive motor by means of the third coupler;

an air outlet is formed at a position of a bottom of the left vertical plate above the build cylinder, an air inlet is formed at a position of a bottom of the right vertical plate above the build cylinder, a left bracket and a right bracket are respectively arranged at positions of upper ends of the left vertical plate and the right vertical plate corresponding to the powder falling module, and a support is arranged at a position of an inner side of the right vertical plate below the right bracket;

the powder falling module comprises a powder falling case, clamping blocks, a fourth coupler, a micromotor, a powder falling channel and a rolling fan blade, the powder falling case has an upper portion being an inlet of a funnel shape and a lower portion being the powder falling channel of a rectangular hollow structure, one clamping block is arranged at each of two ends of the powder falling case, the two clamping blocks are mounted in the left bracket and the right bracket respectively, an upper portion of an inner side of the powder falling channel is provided with the rolling fan blade, one end of the rolling fan blade penetrates the powder falling case and is in transmission connection to the micromotor by means of the fourth coupler, and the micromotor is mounted on the support;

the powder feeding mechanism comprises a first drive motor, a first coupler, a second drive motor, a second coupler, a first lead screw, a first slide block, a first clamp, a first powder feeding spray head, a first powder feeding pipe, a second lead screw, a second slide block, a second clamp, a second powder feeding spray head and a second powder feeding pipe, two ends of the first lead screw and the second lead screw are respectively mounted on two pairs of the L-shaped brackets, one end of the first lead screw is in transmission connection to the first drive motor by means of the second coupler, one end of the second lead screw is in transmission connection to the second drive motor by means of the first coupler, the first slide block is arranged on the first lead screw, the first clamp is arranged at a front end of the first slide block, the first powder feeding spray head is clamped in the first clamp, the first powder feeding pipe extends out from a top end of the first powder feeding spray head, the second slide block is arranged on the second lead screw, the second clamp II is arranged at a front end of the second slide block, the second powder feeding spray head is clamped in the second clamp, and the second powder feeding pipe extends out from a top end of the second powder feeding spray head; and the powder storage strip is internally provided with a powder cavity of a hollow structure, an upper end of the powder storage strip is not higher than a lower end of the powder falling case, a lower nozzle of the first powder feeding spray head and a lower nozzle of the second powder feeding spray head, and a bottom end of the powder storage strip is provided with a powder discharge port.

2. The multi-metal material build device using laser 3D printing according to claim 1, further comprising heaters, wherein the heaters are arranged at lower ends of the first build substrate and the second build substrate, and laser used by the optical path system is Bessel beam.

3. The multi-metal material build device using laser 3D printing according to claim 1, wherein an inlet size of the powder collecting box is greater than a size of the powder collecting channel.

4. The multi-metal material build device using laser 3D printing according to claim 1, wherein the screw rod has a length greater than the lengths of the three powder collecting grooves.

5. The multi-metal material build device using laser 3D printing according to claim 1, further comprising a powder conveyor, wherein the lower nozzle of the first powder feeding spray head and the lower nozzle of the second powder feeding spray head have diameters less than 1 mm, and inlets of the first powder feeding pipe and the second powder feeding pipe are connected to the powder conveyor.

6. The multi-metal material build device using laser 3D printing according to claim 1, wherein the slide connection block is driven by a motor through a belt.

7. The multi-metal material build device using laser 3D printing according to claim 1, wherein the rear scraper and the front scraper are made of high speed steel, and arc-shaped blades are arranged at a bottom of the rear scraper and a bottom of the front scraper.

8. A working method of the multi-metal material build device using laser 3D printing according to claim 1, comprising:

step 1: connecting inert protective gas to enter from the air inlet and come out of the air outlet, manufacturing a build base plate according to a forming size of a part, and mounting the build base plate on the first build substrate or the second build substrate according to a size of the build base plate;

step 2: adding a first metal powder into the powder falling case according to a material property requirements of a forming part, moving the slide connection block along the slide rails, so as to arrange the powder storage strip at the lower end of the powder falling case, starting the third drive motor, moving the third slide block along the screw rod, so as to arrange a powder collecting box of a first powder collecting structure at a lower end of the powder collecting channel, controlling the micro-motor to drive the rolling fan blade to rotate to make the first metal powder fall into the powder cavity along the powder falling channel, moving the slide connection block along the slide rail to drive the powder storage strip to pass through the build base plate, making the first metal powder fall out along the powder discharge port and evenly spread on the build base plate under the action of the rear scraper, and making remaining first metal powder enter the powder collecting cylinder from the powder falling port and fall into a first powder collecting box through the powder collecting channel, so as to complete recovery of the first metal powder;

step 3: scanning, by laser of an optical path system, the metal powder on the build base plate along a preset trajectory, so as to melt the metal powder to form a formed object, after scanning, controlling, by the first piston and the second piston, the first build substrate and the second build substrate respectively to descend by a height of one layer thickness, moving the slide connection block along the slide rail in an opposite direction, and performing, by the front scraper, powder spreading of a next layer;

step 4: repeating step 3 until the first metal powder is completely formed;

step 5: making a first powder feeding pipe in communication with a second metal powder according to the material property requirements of the forming part for second metal powder forming, moving the slide connection block along the slide rail, so as to arrange the powder storage strip below the first powder feeding spray head, making the second metal powder fall into the first powder feeding spray head along the first powder feeding pipe, controlling the second drive motor to move the first slide block along the first lead screw, making the second metal powder fall into the powder cavity from a nozzle of the first powder feeding spray head, controlling the third drive motor to move the third slide block along the screw rod, so as to arrange a powder collecting box of a second powder collecting structure at a lower end of the powder collecting channel, moving the slide connection block along the slide rail to drive the powder storage strip to pass through the formed object, making the second metal powder fall out along the powder discharge port and evenly spread on the formed object under an action of the rear scraper, and making a remaining second metal powder enter the powder collecting cylinder from the powder falling port and fall into the second powder collecting box through the powder collecting channel, so as to complete recovery of the second metal powder;

step 6: repeating step 3 until the second metal powder is completely formed;

step 7: making the second powder feeding pipe in communication with a third metal powder according to the material property requirements of the forming part for third metal powder forming, moving the slide connection block along the slide rail, so as to arrange the powder storage strip below the second powder feeding spray head, making the third metal powder fall into the second powder feeding spray head along the second powder feeding pipe, controlling the first drive motor to move the second slide block along the second lead screw, making the third metal powder fall into the powder cavity from a nozzle of the second powder feeding spray head, controlling the third drive motor to move the third slide block along the screw rod, so as to arrange a powder collecting box of a third powder collecting structure at the lower end of the powder collecting channel, moving the slide connection block along the slide rail to drive the powder storage strip to pass through the formed object, making the third metal powder fall out along the powder discharge port and evenly spread on the formed object under the action of the rear scraper, and making remaining third metal powder enter the powder collecting cylinder from the powder falling port and fall into the third powder collecting box through the powder collecting channel, so as to complete recovery of the third metal powder; and step 8: repeating step 3 until the third metal powder is completely formed.

* * * * *